Sept. 18, 1928.  R. A. OSTRAM ET AL  1,684,410
SHELVING
Filed March 30, 1927     4 Sheets-Sheet 1

Inventors:
Roy A. Ostram and
Carl Edward Fryhdahl
By Wm. O. Belt
Atty

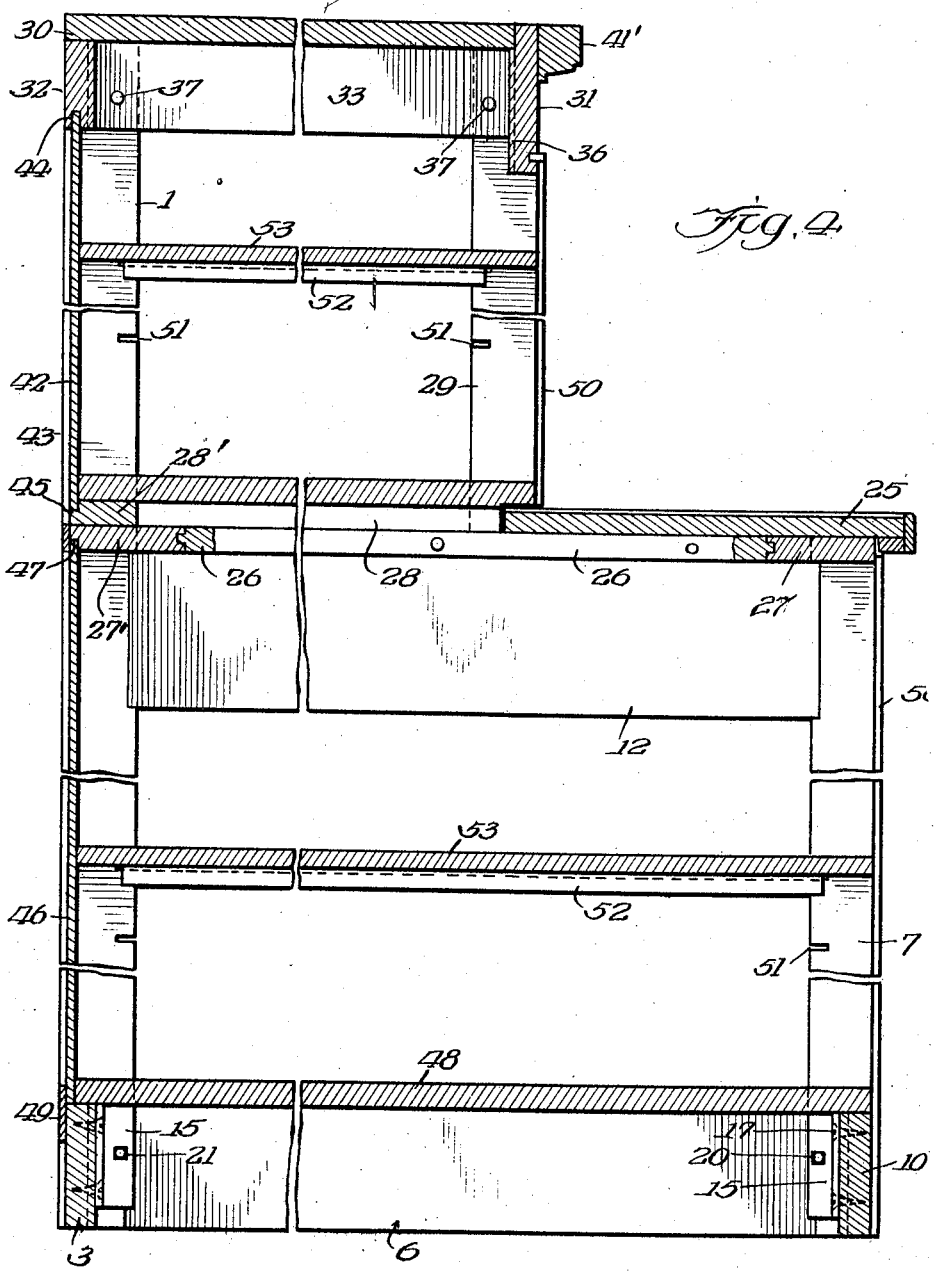

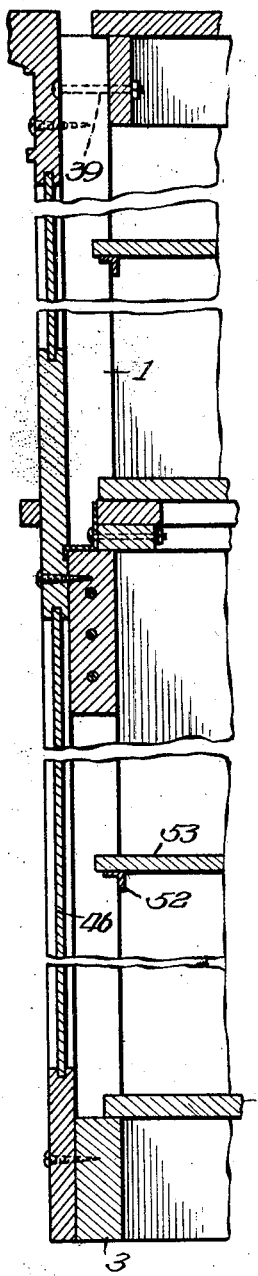
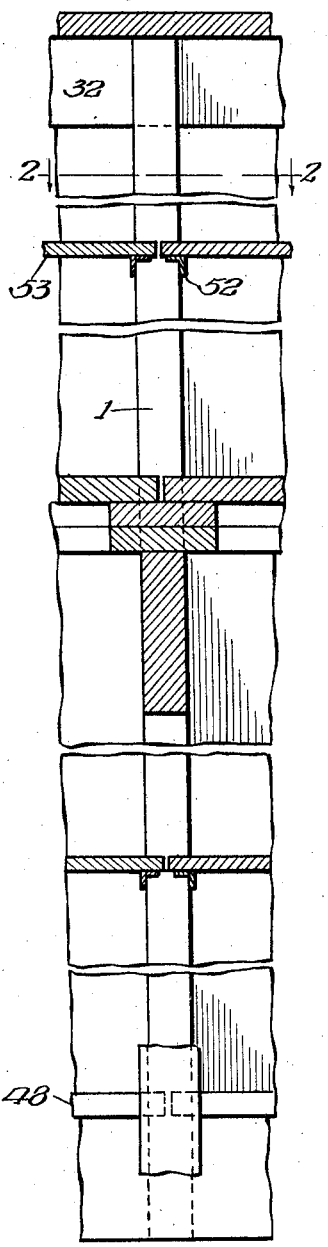
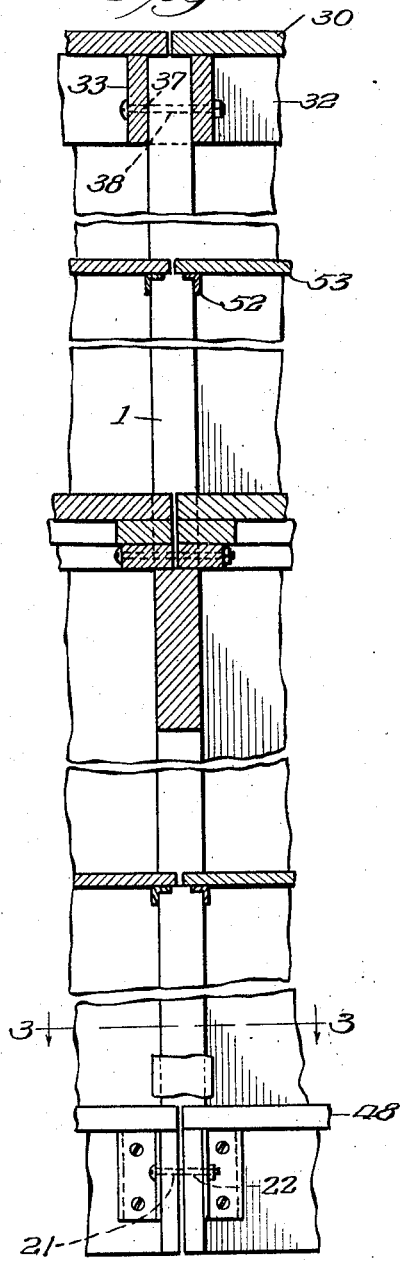

Sept. 18, 1928.  R. A. OSTRAM ET AL  1,684,410
SHELVING
Filed March 30, 1927   4 Sheets-Sheet 4
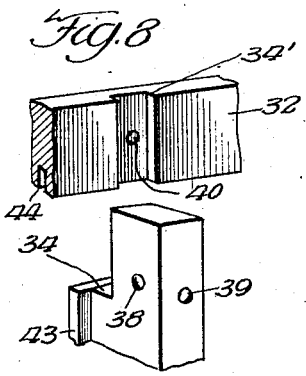
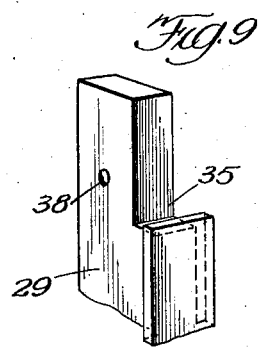
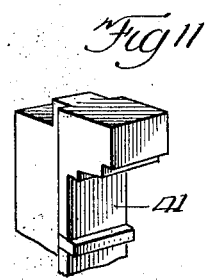
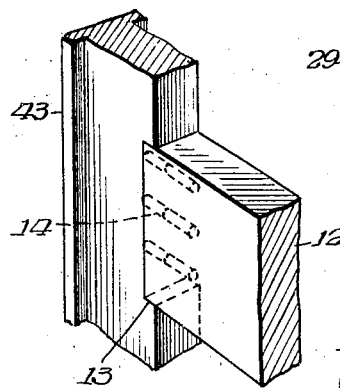
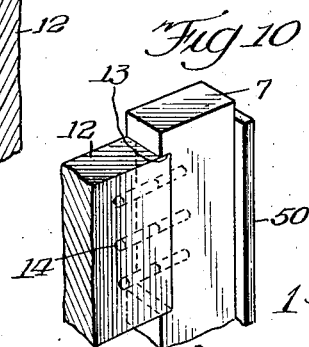
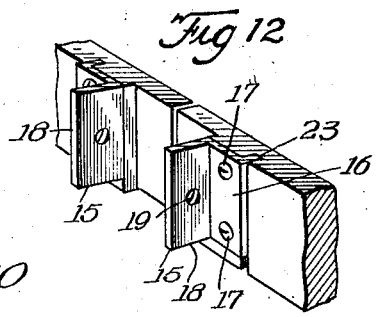
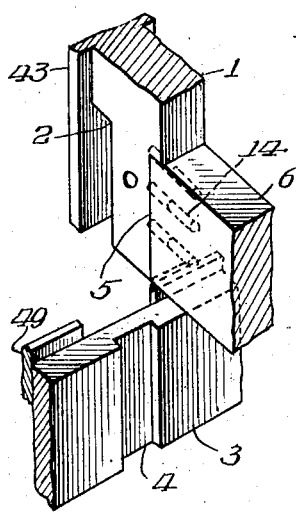
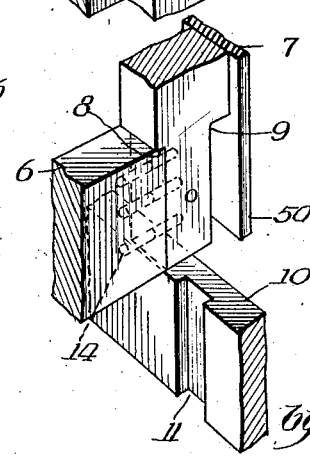
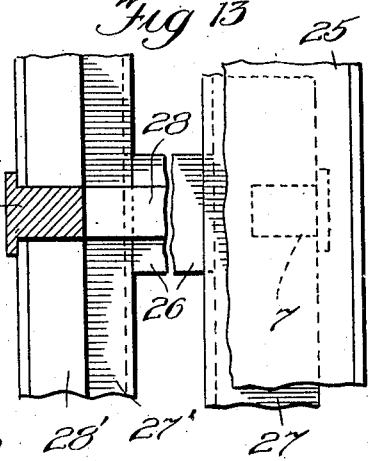

Patented Sept. 18, 1928.

1,684,410

UNITED STATES PATENT OFFICE.

ROY A. OSTRAM AND CARL EDWARD FRYKDAHL, OF DULUTH, MINNESOTA, ASSIGNORS TO DULUTH SHOW CASE COMPANY, OF DULUTH, MINNESOTA, A CORPORATION OF MINNESOTA.

SHELVING.

Application filed March 30, 1927. Serial No. 179,461.

This invention relates to rack shelving and more particularly to rack shelving of the knock down type which has removable and interchangeable parts and which is particularly adapted for use in mercantile establishments such as hardware stores and the like for displaying tools, hardware and other merchandise.

The invention departs from the ordinary rack shelving in that the construction of the rack is made up of few and simple parts that may be knocked down and replaced and still maintain its original rigidity and still be ornamental and attractive.

The object of the invention is to provide rack shelving of the knock down type which can be readily assembled, which is strong and durable and which is adapted to be added to in sections.

Another object thereof is to provide improved means for assemblying the racks in a simple, efficient and durable manner and which can be easily and economically manufactured and transported.

A further object is to provide a rack which is ornamental and which will enhance the looks of the store by forming a very attractive display rack made up in sections to allow the storekeeper to add such further sections as may be required at a very low expense.

In accordance with the invention each section comprises vertical posts, longitudinal and cross members for supporting and bracing the framework and shelves which are supported by means carried by the posts.

A preferred embodiment of the invention is illustrated in the accompanying drawings, in which Fig. 1 is a front perspective view of a rack composed of three sections.

Fig. 4 is a sectional view taken on line 4—4 of Fig. 1.

Fig. 5 is a sectional view through one of the end sections on line 5—5 of Fig. 1.

Fig. 6 is a sectional view taken on line 6—6 of Fig. 1.

Fig. 7 is a sectional view taken on line 7—7 of Fig. 1 and shows the manner in which two sections are connected together.

Fig. 8 is a fragmentary perspective view of one of the rear uprights.

Fig. 9 is a fragmentary perspective view of the upper posts.

Fig. 10 is a similar view of the lower front posts.

Fig. 11 is a perspective view of the cap which is mounted on the upper end posts.

Fig. 12 is a perspective view of the connecting members applied to the base boards of the racks for fastening two sections together.

Fig. 13 is a plan view of a part of the rack showing braces which are connected to the uprights and the lower front posts.

Figure 1:
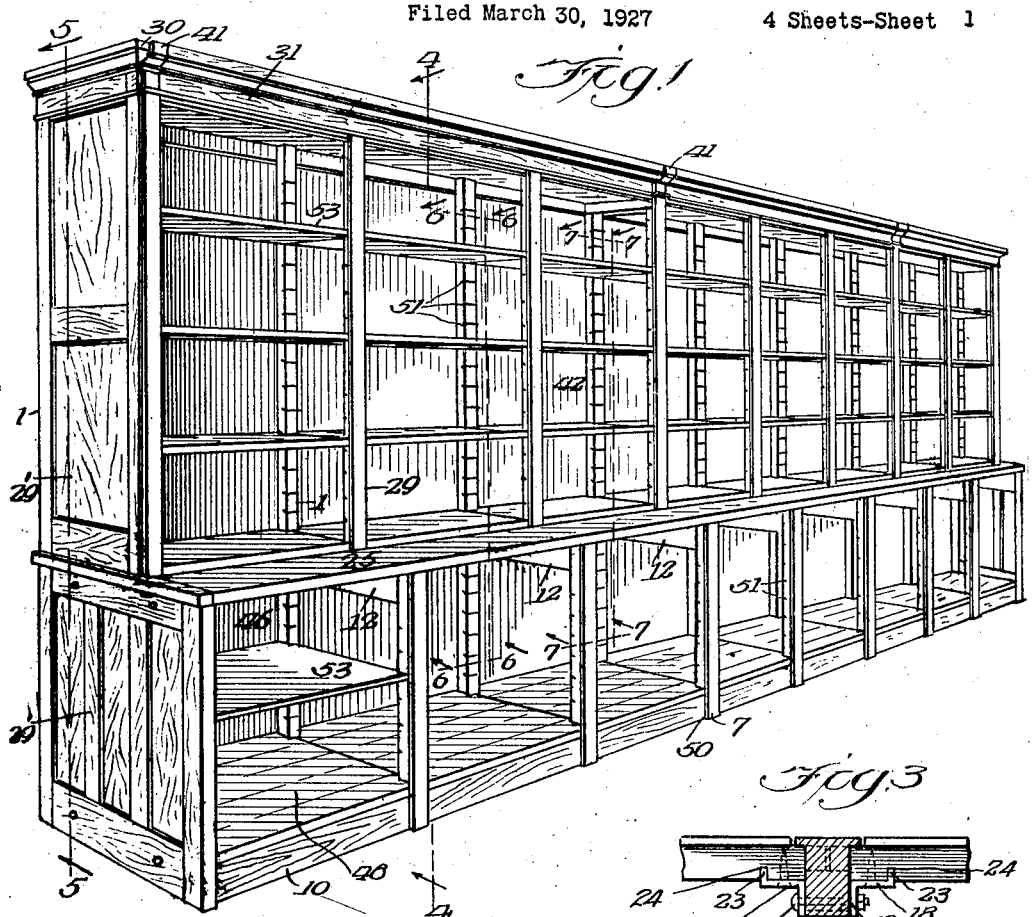

Referring to the drawings 1 are rear uprights of sufficient length to extend throughout the entire height of the rack and are spaced at suitable intervals. These uprights have a rabbet 2 on the rear ends thereof to receive longitudinal rear base boards 3 which extend throughout the entire length of each section. The base boards are provided with slots or recesses 4 into which the lower ends of the uprights 1 are fitted.

These uprights are also rabbeted at the bottom of their front ends to form a recess 5 for receiving lower cross ties 6. Spaced oppositely from the uprights and connected to the opposite ends of the lower cross ties are lower front posts 7 which are provided with a recess 8 into which the cross ties 6 are fitted. The front ends of these posts are also provided with a rabbet 9 to receive longitudinal base boards 10 which have a slot 11 for receiving the lower end of the lower front posts 7.

Intermediate cross tie members 12 also connect the uprights and the lower front posts which have recesses 13 to receive each end of these intermediate cross ties. The lower and intermediate cross ties are rigidly attached to the uprights and front posts by dowels 14 extending into each of the members.

At the ends of each section where further reinforcements and rigidity is required attaching members 15 are employed.

Figure 3:
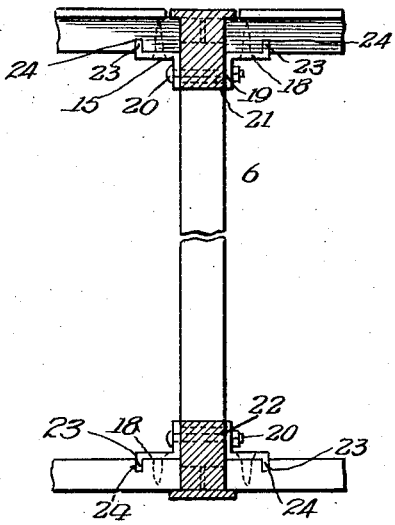
Fig. 3 is a sectional view taken on the line 3—3 of Fig. 7, the floor of the rack being omitted.

These members, preferably made of metal, provide for simple and efficient means to rigidly connect the sections together. The attaching members have a leg 16 which is fastened to the base boards by any suitable means such as screws 17. Another leg 18 extends inwardly from the leg 16 and is integrally formed therewith. Alined holes 19 formed in the legs 16 receive bolts 20 which pass through alined holes 21 and 22 in the uprights and front posts respectively. The member 15 also has a flange 23 extending outwardly from the leg 16 and fits into a slot 24 formed in the base boards. A firm immovable connection is thereby provided for connecting the end members. In cases where other sections are added as shown in Fig. 7 the bolts 20 pass through to the members 15 secured to the base boards of each section and the end uprights and posts. Thus by tightening the bolts the sections are drawn tightly together and the base boards are firmly anchored to the posts. The construction is clearly shown in Fig. 3.

A front flat member 25 extending longitudinally the entire length of the section is connected on its bottom by braces 26 which extend rearwardly and these braces are connected to front and rear longitudinal members 27 and 27' which extend the entire length of the section. A frame is thus provided which is supported by the intermediate cross tie members. The front longitudinal member 27 is notched to engage the lower front posts 7, thereby locating and securing the posts at their upper ends, and the longitudinal member 27' is notched to accommodate the uprights 1 which extend upwardly therethrough, thus spacing and engaging the uprights at this intermediate point. Fillers 28 are arranged on top of the braces 26 and fillers 28' are arranged on top of the member 27' and make the framework flush with the top of shelf or member 25. These members are clearly shown in Fig. 13.

Substantially in the center of the braces and in close proximity to the members 25 are notches and in alinement with the uprights and lower front posts and between the same are upper posts 29 which have their lower ends engaging the notches.

Suitable paneling 29' may be provided to fill in the ends as clearly shown in Fig. 1.

In actual practice however it has been found preferable to make the ends separately by providing a unitary structure composed of separate end posts and intermediate posts which are connected together by rails, the space between the rails and the posts being filled in with panels. The lower part of the ends have rails connecting the rear upright posts to the front posts and styles at intervals connecting the rails. The remaining space being filled in with suitable panels.

A unitary end structure is thus provided which can be connected to the base boards and to the cross tie members in the same manner as the uprights and front end posts. These ends can thus be readily removed as a unit, additional sections added, and the ends readily and easily attached to the new sections.

A top 30 is mounted upon the rear uprights and connected to the ends. Upper posts 29 are positioned in place at the corners when the ends are omitted, for example, where there are more than one section being used. When only two sections are employed the top is connected to the end on one side and supported by a top post at the other end. The rear uprights being already in place support the top at spaced intervals at the rear of the section.

The top has front and back longitudinal top members 31 and 32 respectively extending along the full length of the top and top ties 33 at each end extending across the full width of the top. The uprights are notched on their rear sides to form a shoulder 34 to support the rear top members. The top members are grooved at 34' to receive the uprights. Likewise the top posts are notched to form a shoulder 35 to receive the front top members 31 which have grooves 36 to receive the upper posts 29.

The top ties have holes 37 extending therethrough in alinement with holes 38 in the top of the uprights and front posts to receive suitable fastening members to hold the parts securely in place.

Where two section are joined together the fastening means passes through two of the top ties and the post and securely fastens the sections together and brace the same laterally as clearly shown in Fig. 7.

The rear uprights are further provided with holes 39 to receive fastening means passing therethrough and through an alined hole 40 in their rear top members 32 for securely fastening these parts together.

As the longitudinal members on the top extend only to the cross ties it will be noted that an opening occurs at the end posts. These opening are filled with a filler block 41 maintained in place in any suitable manner.

Suitable moulding 41' may be mounted on the top to give the rack an ornamental appearance. The blocks 41 may likewise be made ornamental to conform with the moulding on the top.

Panels or backs 42 for the upper part of each section are inserted between the uprights and are maintained in position by means of strips 43 formed on the rearward ends of the uprights. These strips and uprights may be formed in a single unitary member. The backs 42 have the upper ends thereof inserted into a groove 44 formed in the rear members 32 and have their bottoms resting on the rear filler members 28. The rear filler members may be notched as at 45 to receive these ends.

Bottom panels 46 are mounted in the lower part of each section and have their upper ends received by notches 47 formed on the bottom of rear members 27 and the bottom ends resting on the rear base boards. These panels are maintained in position laterally by the strips 43 formed integrally with the uprights. A bottom shelf or floor 48 is supported by the front and back base boards and the cross ties and further braces the rack. This floor abuts the lower ends of the backs and rigidly holds the backs in place by pressing the same against strips 49 secured to the rearward side of the rear base boards. These strips extend between the integral strips 43 and serve to conceal the joint between the base board and the panel and further serve to hold the panel in position laterally.

Moulding 50 attached to the front of the intermediate posts and lower posts conceal the joints on the front. The moulding on the intermediate or upper posts extends downwardly and rest on the flat member or shelf 25 and the moulding on the front lower posts extends from the bottom of the shelf to the floor as shown in Fig. 10. This moulding improves the appearance of the rack and covers the joints which occur along the posts.

The uprights and the upper and lower front posts have grooves 51 spaced at intervals to receive shelf supports 52 which carry movable shelves 53. The grooves are formed on the front edge of the uprights and on the rearward edges of the upper and lower front posts.

Figure 2:
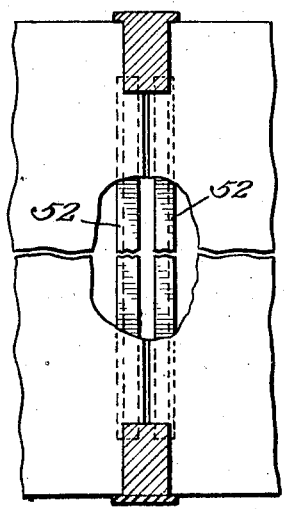
Fig. 2 is a fragmentary sectional view taken on the line 2—2 of Fig. 6.

The shelf supports may be made of suitable strips of angle iron cut to the proper length and inserted in the proper grooves. This construction is clearly shown in Figs. 2 and 6.

Thus the shelves are removable and interchangeable and any number of shelves required may be installed at suitable distances apart.

As the bottom shelf in the top part of each section rests on the filler 28 and the ledge 25 no other support will be required.

Each part of the rack is cut to proper size and shape and it will readily be seen that a rack is provided which can be easily knocked down and erected in a very short time. The rack is very rigid and is capable of carrying a great weight and maintain its rigidity and appearance.

It is apparent that changes in form, construction and arrangement of parts may be made without departing from the spirit and without sacrificing the advantages of the invention and the right is reserved to make all such changes as fairly fall within the scope of the following claims.

We claim:

1. A sectional store fixture comprising a plurality of rear uprights and lower posts, base boards connected to said uprights and said posts, upper and lower cross members connecting said uprights and said posts together, a longitudinal member mounted on said upper cross members, intermediate posts mounted on said top cross members and engaging said longitudinal member and a top mounted on said uprights and said intermediate posts and connected thereto, detachable means for connecting each section to adjoining sections for drawing said sections together, said uprights and upper and lower posts provided with a plurality of grooves, means engaging said grooves and forming a support, and removable shelves mounted on said supports.

2. A sectional store fixture comprising a plurality of rear uprights and lower posts, base boards connected to said uprights and said posts, upper and lower cross members connecting said uprights and said posts together, a longitudinal member mounted on said upper cross members, intermediate posts mounted on said top cross members and engaging said longitudinal member and a top mounted on said uprights and said intermediate posts and connected thereto, means for connecting each section to adjoining sections, said uprights and upper and lower posts provided with a plurality of grooves on their inner faces and extending through the sides thereof, angle irons engaging said grooves on each side of said uprights and posts and forming supports, and removable shelves mounted on said supports.

3. A store fixture comprising a plurality of rear uprights and lower posts, base boards connected to said uprights and said posts, upper and lower cross members connecting said uprights and said posts together, a longitudinal member mounted on said upper cross members, intermediate posts mounted on said longitudinal member and supported by said upper cross members, a top mounted on said uprights and said intermediate posts and connected thereto, removable ends connected to said uprights and upper and lower posts, and removable backs mounted between said uprights and connected thereto.

4. A sectional store fixture comprising a plurality of rear uprights and lower posts, base boards connected to said uprights and said posts, upper and lower cross members connecting said uprights and said posts together, a longitudinal member mounted on said upper cross members, intermediate posts mounted on said top cross members and engaging said longitudinal member and a top mounted on said uprights and said intermediate posts and connected thereto, metal plates having a flange rabbeted in said base board and fastened to the uprights and the front lower posts for connecting each section to adjoining sections at the bottom thereof, ends connected to said uprights and upper and lower posts and backs mounted between said uprights and connected thereto.

5. A store fixture comprising a plurality of rear uprights and lower posts, base boards connected to said uprights and said posts, upper and lower cross members connecting said uprights and said posts together, a longitudinal member mounted on said upper cross members, intermediate posts removably mounted on said top cross members and engaging said longitudinal member, a top mounted on said uprights and said intermedate posts and connected thereto, metal plates having a flange rabbeted in the base boards and arranged on the top and connected to the end posts.

6. A store fixture comprising a plurality of rear uprights and lower posts, base boards connected to said uprights and to said posts, upper and lower cross members connecting said uprights and said posts together, a longitudinal member mounted on said upper cross members, intermediate posts mounted on said top cross members and engaging said longitudinal member, a top mounted on said uprights and said intermediate posts and detachably connected thereto, said uprights and front and lower posts being provided with a plurality of grooves, angle irons mounted in said grooves on their inner faces and into the sides thereof and extending across the rack from the front to the back thereof, movable shelves mounted on said angle irons, metal plates for connecting the base boards and the top to the end posts, ends detachably connected to said uprights and upper and lower posts, and backs mounted between said uprights and detachably connected thereto.

7. A sectional store fixture adapted to be readily knocked-down and assembled comprising a plurality of uprights, lower posts spaced from said uprights and in alinement therewith, upper and lower cross ties rabbeted in said uprights and said posts, a longitudinal member on said upper ties and transversely thereof, intermediate posts having their lower ends engaging said longitudinal member and said upper cross ties, base boards connected to said uprights and to said lower posts, flanged plates rabbeted in said base boards and engaging said uprights and lower posts, and means passing through said plates and said posts and uprights for fastening one section to an adjoining section.

ROY A. OSTRAM.
CARL EDWARD FRYKDAHL.